United States Patent
Murakami

(10) Patent No.: US 11,197,190 B2
(45) Date of Patent: Dec. 7, 2021

(54) COMMUNICATION DEVICE, COMMUNICATION METHOD, COMMUNICATION COMPUTER PROGRAM PRODUCT, AND COMMUNICATION SYSTEM

(71) Applicant: Kabushiki Kaisha Toshiba, Minato-ku (JP)

(72) Inventor: Takaomi Murakami, Kamakura (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 6 days.

(21) Appl. No.: 16/550,459

(22) Filed: Aug. 26, 2019

(65) Prior Publication Data

US 2020/0221334 A1 Jul. 9, 2020

(30) Foreign Application Priority Data

Jan. 7, 2019 (JP) .............................. JP2019-000705

(51) Int. Cl.
- *H04W 28/02* (2009.01)
- *H04W 24/10* (2009.01)
- *H04W 28/04* (2009.01)
- *H04W 28/10* (2009.01)

(52) U.S. Cl.
CPC ....... *H04W 28/0284* (2013.01); *H04W 24/10* (2013.01); *H04W 28/0231* (2013.01); *H04W 28/0289* (2013.01); *H04W 28/04* (2013.01); *H04W 28/10* (2013.01)

(58) Field of Classification Search
CPC ......... H04W 28/0284; H04W 28/0231; H04W 24/10; H04W 28/04; H04W 28/10; H04W 28/0289; H04W 24/02; H04W 84/18
See application file for complete search history.

(56) References Cited

U.S. PATENT DOCUMENTS

| | | | |
|---|---|---|---|
| 2005/0193309 A1 | 9/2005 | Grilli et al. | |
| 2010/0091801 A1 | 4/2010 | Itakura et al. | |
| 2011/0267966 A1 | 11/2011 | Gao et al. | |
| 2013/0117638 A1 | 5/2013 | Yang et al. | |
| 2014/0169178 A1* | 6/2014 | Nagata .............. | H04W 28/0284 370/241 |
| 2014/0325302 A1 | 10/2014 | Lee et al. | |
| 2015/0180609 A1 | 6/2015 | Yang et al. | |

(Continued)

FOREIGN PATENT DOCUMENTS

| | | |
|---|---|---|
| JP | 2007-503174 A | 2/2007 |
| JP | 2008-506292 A | 2/2008 |

(Continued)

*Primary Examiner* — Jung H Park
(74) *Attorney, Agent, or Firm* — Oblon, McClelland, Maier & Neustadt, L.L.P.

(57) ABSTRACT

An electronic apparatus includes processing circuitry functioning as an acquisition part and a change part, and includes communication circuitry. The acquisition part acquires a control command regarding the volume of traffic per unit time. The change part changes a communication parameter to reduce the volume of traffic per unit time in accordance with the control command. The communication circuitry performs multi-hop wireless communications with the volume of traffic according to the changed communication parameter.

10 Claims, 4 Drawing Sheets

(56) References Cited

U.S. PATENT DOCUMENTS

2016/0294508 A1* 10/2016 Takeuchi ................ H04L 1/007
2017/0012861 A1*  1/2017 Blumenthal ............ H04L 67/28

FOREIGN PATENT DOCUMENTS

| JP | 2010-514275 A    | 4/2010  |
|----|------------------|---------|
| JP | 4577341 B2       | 11/2010 |
| JP | 5016279 B2       | 9/2012  |
| JP | WO2013/04221 A1  | 3/2013  |
| JP | 2013-070418 A    | 4/2013  |
| JP | 5220340 B2       | 6/2013  |
| JP | 2014-533032 A    | 12/2014 |
| JP | 5743350 B2       | 7/2015  |

* cited by examiner

FIG.4

| COMMUNICA-TION DATE AND TIME | NODE ID OF COMMUNICATION DESTINATION | COMMUNICA-TION RESULT |
|---|---|---|

| NODE ID | ADJACENT PARENT NODE ID |
|---|---|
| F | E |
| E | C |
| C | B |
| D | B |
| B | A |
| G | A |
| J | I |
| I | H |
| H | A |

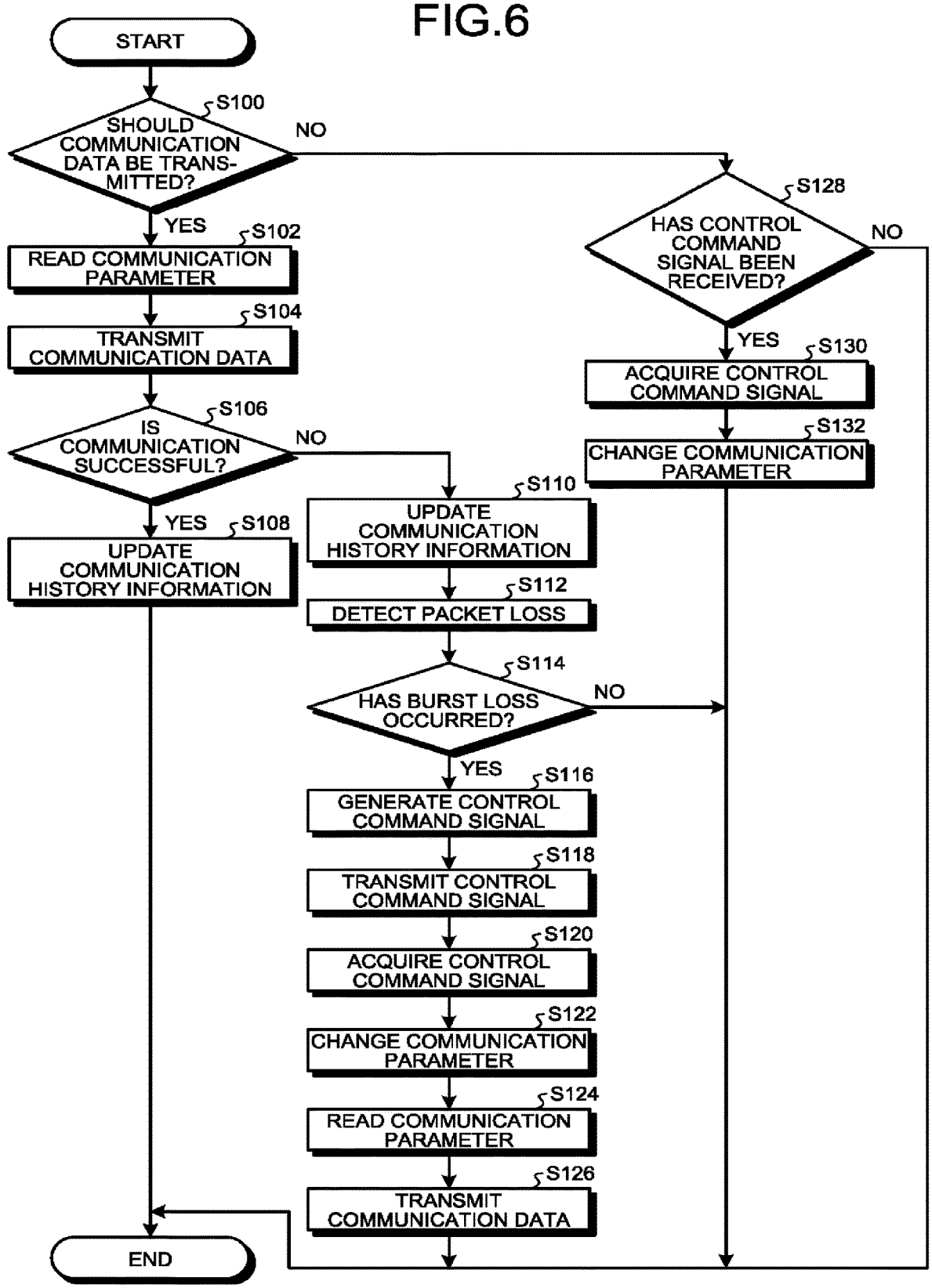

COMMUNICATION DEVICE, COMMUNICATION METHOD, COMMUNICATION COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2019-000705, filed on Jan. 7, 2019; the entire contents of which are incorporated herein by reference.

FIELD

Embodiments described herein relate generally to a communication device (an electronic apparatus), a communication method, a communication computer program product, and a communication system.

BACKGROUND

A technique is disclosed for preventing data congestion in a system that performs wireless communications of communication data such as video data. For example, a technique is disclosed for recovering a burst loss by a specified time by transmitting an error correcting packet later than video data by the specified time. Conventional technologies are described in Japanese Patent Application Laid-open No. 2013-70418, for example.

Conventional technologies, however, have had difficulty in preventing congestion of communication data communicated over a multi-hop network.

BRIEF DESCRIPTION OF THE DRAWINGS

FIG. 4 is a schematic diagram illustrating a data formation of communication history information;

FIG. 5 is a schematic diagram illustrating a data formation of connection management information; and FIG. 6 is a flow chart illustrating a flow of communication processing.

DETAILED DESCRIPTION

A communication device (an electronic apparatus) includes processing circuitry functioning as an acquisition part and a change part, and includes communication circuitry. The acquisition part acquires a control command regarding the volume of traffic per unit time. The change part changes a communication parameter to reduce the volume of traffic per unit time in accordance with the control command. The communication circuitry performs multi-hop wireless communications with the volume of traffic according to the changed communication parameter.

The communication device (electronic apparatus), the communication method, the communication computer program product, and a communication system are described in detail below with reference to the accompanying drawings.

Figure 1:
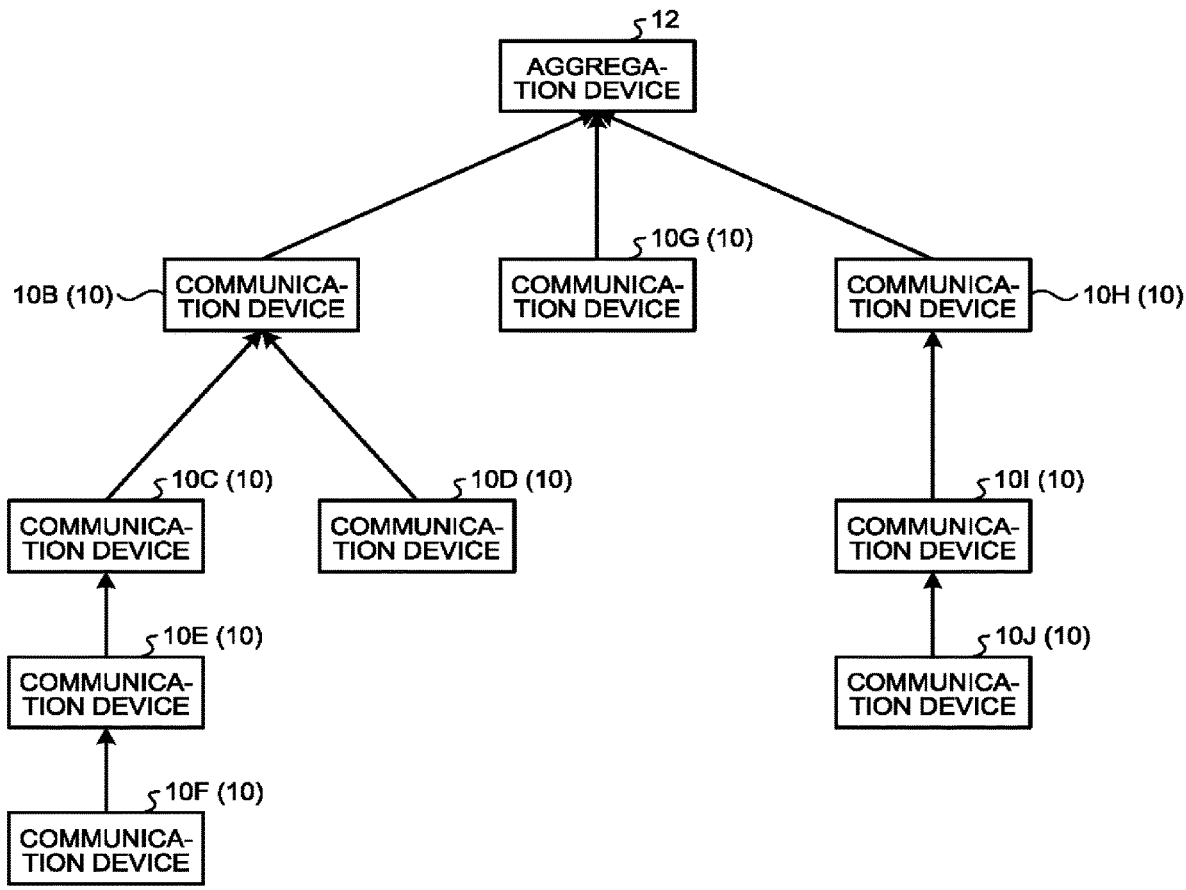
FIG. 1 is a schematic diagram of a communication system according to an embodiment.

FIG. 1 is a schematic diagram illustrating an example of a communication system 1 according to the present embodiment.

The communication system 1 includes an aggregation device 12 and a plurality of communication devices (electronic apparatuses) 10. The number of communication devices 10 may be any number. FIG. 1 illustrates 9 communication devices 10 (a communication device 10B to a communication device 10J), as an example. The aggregation device 12 and the communication devices 10 constitute a multi-hop network on which the aggregation device 12 serves as a root node.

The aggregation device 12 is a parent node to all of the communication devices 10 included in the communication system 1 and is sometimes referred to as a root node. In the communication system 1 of the present embodiment, a form is described in which the communication devices 10 are connected wirelessly to the aggregation device 12 in a tree structure. The structure of the communication system 1 is not limited to a tree structure.

The communication devices 10 are nodes that constitute a multi-hop network. The communication devices 10 perform wireless communications by relaying communication data (transmission data) via multi-hop wireless communications. In a multi-hop wireless communication, a communication from a source communication device 10 to a destination communication device 10 (or the aggregation device 12) is performed by being relayed by other communication devices 10. Thus, communication data transmitted by each of the communication devices 10 is transmitted to the aggregation device 12 by being relayed by other communication devices 10 or directly. The aggregation device 12 aggregates the communication data transmitted by each of the communication devices 10.

A publicly known communication method may be used for multi-hop wireless communications performed by the communication devices 10 and the aggregation device 12. For example, the communication devices 10 and the aggregation device 12 perform multi-hop wireless communications using a publicly known time division wireless communication system.

FIG. 1 illustrates an example of communications from each of the communication devices 10 to the aggregation device 12 in the upstream direction. The arrows in FIG. 1 indicate directions of transmitting communication data. In the communication system 1, however, communications are also performed from the aggregation device 12 to each of the communication devices 10 in the downstream direction.

A hardware configuration of the communication devices 10 is described next.

Figure 2:
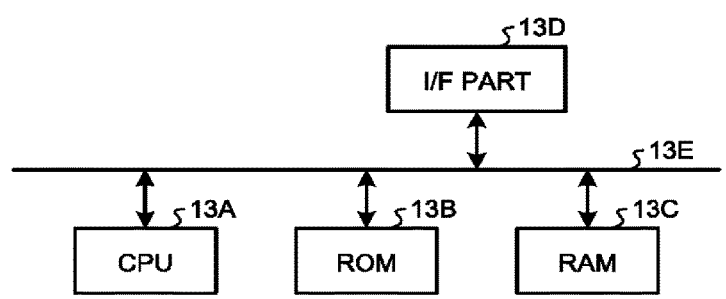
FIG. 2 is a hardware configuration diagram of a communication device.

FIG. 2 is an example of a hardware configuration diagram of the communication devices 10.

The communication devices 10 each has a central processing unit (CPU) 13A, a read only memory (ROM) 13B, a random access memory (RAM) 13C, an I/F part 13D, or the like connected to one another via a bus 13E, and has a hardware configuration that uses a normal computer.

The CPU 13A is an arithmetic unit that controls the communication devices 10. The ROM 13B stores therein computer programs that enable the CPU 13A to execute various types of processing, for example. The RAM 13C stores therein data necessary for various types of processing executed by the CPU 13A. The I/F part 13D is an interface through which to connect to an external device or any other device.

Computer programs executed in the communication devices 10 of the present embodiment are provided by being preinstalled on the ROM 13B or the like. The computer programs executed in the communication devices 10 of the present embodiment may be configured to be provided by being recorded into a computer-readable recording medium, such as a CD-ROM, a flexible disk (FD), a CD-R, a digital versatile disc (DVD), in a file format installable on the communication devices 10 or an executable file format.

A functional configuration of the communication devices 10 is described next.

Figure 3:
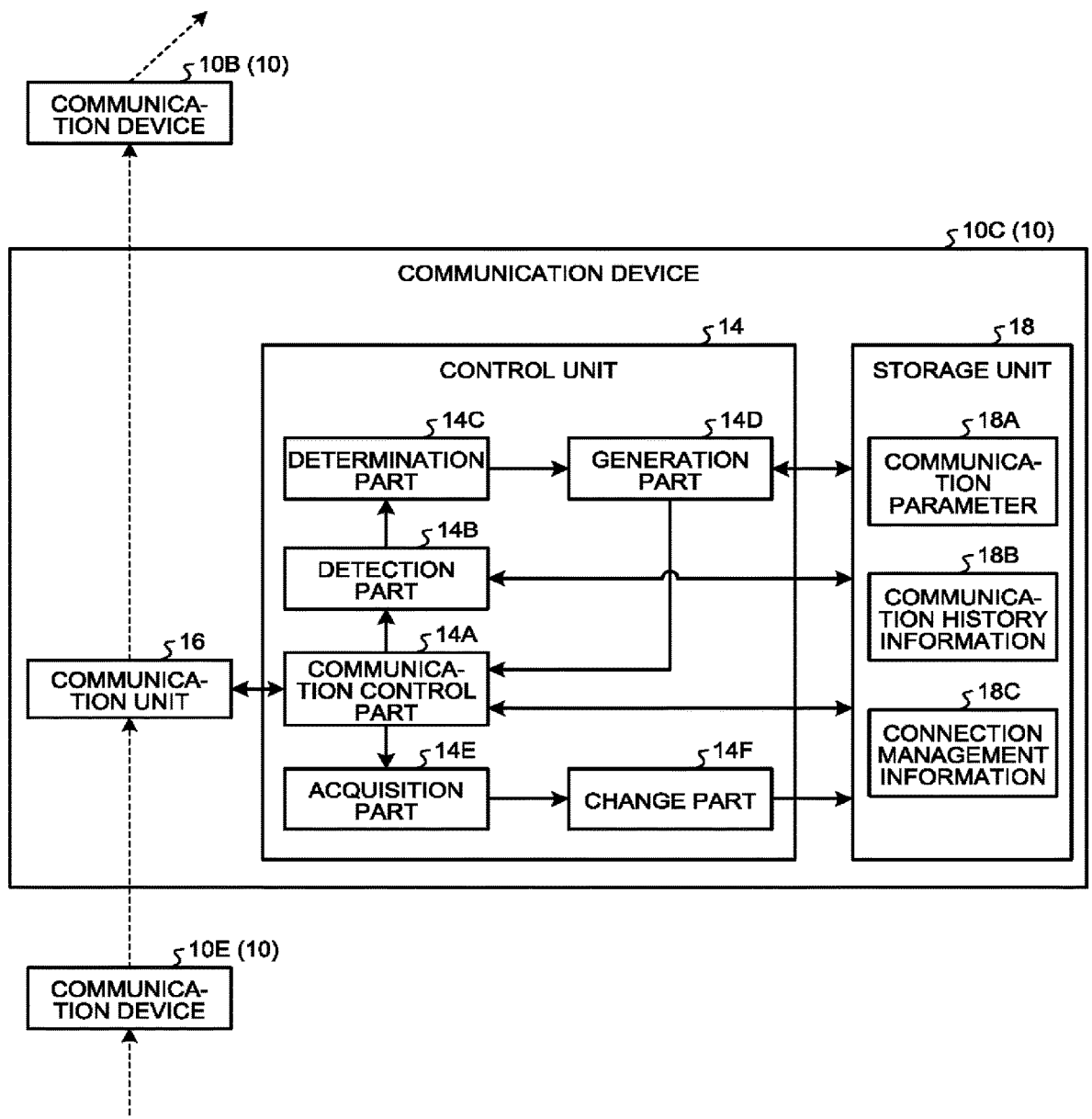
FIG. 3 is a functional block diagram of the communication device.

FIG. 3 is a functional block diagram illustrating a functional configuration of the communication devices 10. FIG. 3 illustrates a functional block diagram of the communication device 10C as an example. However, any communication devices 10 (the communication device 10B to the communication device 10J) other than the communication device 10C may have the same configuration as that of the communication device 10C.

The communication device 10 has a control unit 14, a communication unit 16, and a storage unit 18. The control unit 14, the communication unit 16, and the storage unit 18 are connected to one another so as to be capable of giving and receiving data or signals.

The communication unit 16 is a communication function unit that performs multi-hop wireless communications with other communication devices 10. The communication unit 16 may be implemented by using a publicly known wireless function of performing multi-hop wireless communications. The communication unit 16 performs multi-hop wireless communications of communication data with other communication devices 10 under the control of the control unit 14.

The communication data is data communicated over a multi-hop network. For example, the communication data includes one or more frames and forward error correction (FEC) codes. The communication data may be in a form that includes no FEC.

The storage unit 18 stores therein various types of data. The storage unit 18 is, for example, a RAM, a semiconductor memory device such as a flash memory, a hard disk, an optical disk, a memory card such as an SD card, and a universal serial bus (USB) memory. The storage unit 18 may be a storage device disposed outside the communication device 10. The storage unit 18 may also be a storage medium. Specifically, the storage medium may store or temporarily store therein computer programs or various types of information after being downloaded over a local area network (LAN) and the Internet. The storage unit 18 may also be made up of a plurality of storage media.

In the present embodiment, the storage unit 18 stores therein a communication parameter 18A, communication history information 18B, and connection management information 18C. The details of such information will be described later.

The control unit 14 includes communication circuitry (a communication control part 14A) and processing circuitry (a detection part 14B, a determination part 14C, a generation part 14D, an acquisition part 14E, and a change part 14F).

These parts are each implemented, for example, by one or more processors. For example, the aforementioned parts may be implemented by causing a processor such as a CPU to execute a computer program, in other words, via software. The aforementioned parts may be implemented via a processor such as an integrated circuit (IC), in other words, via hardware. The aforementioned parts may be implemented by making combined use of software and hardware. In a case in which a plurality of processors is used, each processor may implement one of the aforementioned parts, or may implement two or more of the aforementioned parts.

A processor reads and executes a computer program saved in the storage unit 18, thereby implementing the aforementioned parts. Instead of saving a computer program in the storage unit 18, the computer program may be directly built in a circuit of the processor. In this case, the processor reads and executes the computer program built in the circuit, thereby implementing the aforementioned parts.

The communication control part 14A controls the communication control part 14A so as to perform multi-hop wireless communications of communication data with the volume of traffic according to the communication parameter 18A.

The communication control part 14A reads the communication parameter 18A from the storage unit 18. The communication parameter 18A is stored in advance in the storage unit 18 and is changed by the change part 14F to be described later.

The communication parameter 18A is a parameter for the volume of traffic per unit time. Specifically, the communication parameter 18A includes at least one of a bit rate of communication data and a frame rate of the communication data.

The communication control part 14A controls the communication control part 14A so as to perform multi-hop wireless communications of communication data to be communicated at a bit rate and a frame rate indicated in the communication parameter 18A.

The communication parameter 18A may further include a FEC parameter.

The FEC parameter is, for example, redundancy of data.

In a case in which the communication parameter 18A includes a FEC parameter, the communication control part 14A may execute processing for generating error correction data for communication data to be communicated in accordance with the FEC parameter, and perform multi-hop wireless communications.

The communication control part 14A updates the communication history information 18B every time communication data to be transmitted is transmitted to other communication devices 10 by performing a multi-hop wireless communication.

FIG. 4 is a schematic diagram illustrating an example of a data formation of the communication history information 18B. The communication history information 18B is information in which a communication date and time, a node ID of a communication destination, and a communication result are correlated.

The communication date and time represent a date and time when communication data is transmitted to another communication device 10. The communication date and time may be any information that indicates timing and is not limited to a date and time.

The node ID of a communication destination is identification information that identifies the communication device 10 or the aggregation device 12 to which communication data is communicated. In the present embodiment, the node ID of a communication destination is indicative of another communication device 10 or the aggregation device 12 that serves as a parent node and is adjacent to the communication device 10 from which the communication data is communicated, alternatively is indicative of another communication device 10 that serves as a child node and is adjacent to the communication device 10 from which the communication data is communicated.

The parent node refers to another communication device 10 with which the communication device 10 performs multi-hop wireless communications, and that is on the higher side and closer to the aggregation device 12. Being "closer to the aggregation device 12" means that the number of hops to reach the aggregation device 12 is smaller than the communication device 10 from which the communication data is communicated. The child node refers to another communication device 10 with which the communication device 10 performs multi-hop wireless communications, and that is on the lower side and farther from the aggregation device 12. Being "farther from the aggregation device 12" means that the number of hops to reach the aggregation device 12 is larger than the communication device 10 from which the communication data is communicated.

The node ID of a communication destination only needs to be identification information that is capable of identifying the communication device 10 or the aggregation device 12 to which the communication data is communicated. For example, the node ID of a communication destination is an Internet protocol version 6 (IPv6) address, a media access control (MAC) address, an IPv4 address, and a host name of a domain name system (DNS), but not limited thereto.

The communication result is information indicating success or an error in the communication.

In a case in which a multi-hop wireless communication of communication data is performed and the communication is successful, the communication control part 14A correlates with one another the communication date and time, the node ID of the communication destination of the communication data, the communication result indicating success in the communication, and enters the correlated information in the communication history information 18B. Meanwhile, in a case in which the communication is judged to have an error, the communication control part 14A correlates with one another the communication date and time, the node ID of the communication destination of the communication data, the communication result indicating an error in the communication, and enters the correlated information in the communication history information 18B.

The communication control part 14A determines whether at least a part of packets included in communication data is lost while a multi-hop wireless communication of the communication data is being performed with another communication device 10. The communication control part 14A may determine a packet loss by a publicly known method. When the communication control part 14A has determined that a packet was lost while a multi-hop wireless communication of the communication data is being performed, the communication control part 14A may determine the communication to have an error. When the communication control part 14A has determined that no packet was lost while a multi-hop wireless communication of the communication data is being performed, the communication control part 14A may determine that the communication is successful.

The communication control part 14A then notifies the detection part 14B of a communication result indicating success or an error in the communication.

The detection part 14B detects a packet loss of communication data to be transmitted. A packet loss refers to at least a part of one or more packets included in communication data being lost. The detection part 14B detects a packet loss when receiving a communication result indicating a communication error from the communication control part 14A.

The determination part 14C determines occurrence of a burst loss of the communication data when the detection part 14B has detected a packet loss.

A burst loss refers to a loss of one or more packets included in communication data occurring suddenly with a volume equal to or more than a threshold value per unit time. The threshold value may be preset.

For example, the determination part 14C determines that a burst loss has occurred when the communication history information 18B satisfies a predetermined condition. A predetermined condition is, for example, a case in which communication errors are entered in the communication history information 18B for a predetermined number of times in a row. The predetermined number of times may be preset. The predetermined number of times is, for example, ten times. A predetermined condition is also, for example, a case in which a predetermined number of communication results in a row from the present toward the past is indicative of communication errors at a ratio equal to or higher than a predetermined ratio. The predetermined number of times and the predetermined ratio may be preset. The predetermined number of times is, for example, 30 times, but is not limited to this value. The predetermined ratio is, for example, 80%, but is not limited to this value.

In a case in which an error correction using FEC is unable to be made to communication data that has previously been determined to have a communication error, the determination part 14C may determine that the case has a burst loss. The determination part 14C can use a publicly known method to determine whether error correction is able to be made to communication data by using FEC.

In a case in which at least one of the following is satisfied: the communication history information 18B satisfies a predetermined condition; and an error correction using FEC is unable to be made to communication data, the determination part 14C may determine occurrence of a burst loss.

The generation part 14D generates a control command signal (control command) when a burst loss is determined to have occurred.

The control command signal is a signal regarding the volume of traffic per unit time.

For example, the control command signal is a command signal. The command signal is a signal to instruct the volume of traffic per unit time, when multi-hop wireless communications are performed, be changed so as to be smaller than the current volume.

The control command signal may also be a definition signal predefined with a receiving end of the control command signal.

Assume that a control command signal is the aforementioned command signal or the aforementioned definition signal. In this case, the receiving end of the control command signal may, when having determined that received data is the control command signal representing the aforementioned definition signal or the aforementioned command signal, change the volume of traffic per unit time so as to be smaller than the current volume.

For example, the control command signal may also be a signal indicating a value of the communication parameter after being changed. The value of the communication parameter after being changed may be a value obtained by reducing the volume of traffic per unit time when multi-hop wireless communications are performed to be smaller than the current volume.

The generation part 14D then notifies the communication control part 14A of a generated communication control signal.

The generation part 14D refers to the connection management information 18C and identifies a node ID of a communication destination to which the communication control signal is transmitted. The generation part 14D then notifies the communication control part 14A of the communication control signal and the node ID of the communication destination.

The connection management information 18C is information that specifies a parent node ID of each of the communication devices 10 included in the communication system 1.

FIG. 5 is a schematic diagram illustrating an example of a data formation of the connection management information 18C. The connection management information 18C is information in which a node ID and an adjacent parent node ID are correlated. The node ID is identification information about each of the communication devices 10 included in the communication system 1. The adjacent parent node ID is identification information about another communication device 10 that performs multi-hop wireless communications with the communication device 10 identified by the corresponding node ID, and that is a parent node adjacent to the relevant communication device 10 on the aggregation device 12 side.

The connection management information 18C is generated by the aggregation device 12 when a network topology of the multi-hop network is constructed, for example. The aggregation device 12 generates the connection management information 18C by a publicly known method on the basis of the information aggregated from the communication devices 10. The aggregation device 12 then delivers the connection management information 18C to each of the communication devices 10 included in the communication system 1 by performing multi-hop wireless communications. Thus, the connection management information 18C is stored in each of the communication devices 10 included in the communication system 1. In a case in which the network topology is changed, the aggregation device 12 may deliver the connection management information 18C after being changed to the communication devices 10 by a publicly known method. Thus, the latest connection management information 18C is to be stored in each of the communication devices 10 included in the communication system 1. When a network topology is constructed, each of the communication devices 10 may generate the connection management information 18C. In this case, the connection management information 18C may be information indicating the connection relation of the communication system 1 in part, instead of the communication system 1 in whole.

Return to FIG. 3, and the description is continued. The generation part 14D reads, from the connection management information 18C, the adjacent parent node ID corresponding to the node ID of the communication device 10 into which the generation part 14D is incorporated. The generation part 14D also reads, from the connection management information 18C, the adjacent parent node ID corresponding to the node ID indicating the read adjacent parent node ID in sequence. In this manner, the generation part 14D reads identification information (adjacent parent node ID) about one or more of the other communication devices 10 that are connected in the direction toward the communication destination of the communication data for which a packet loss is detected, over the communication path of multi-hop wireless communications.

The generation part 14D notifies the communication control part 14A of the read identification information and the generated control command signal.

The communication control part 14A receives the control command signal from the generation part 14D. The communication control part 14A outputs the control command signal to the acquisition part 14E. The communication control part 14A also controls the communication unit 16 so as to communicate the control command signal to each of one or more of the communication devices 10 identified by the identification information received from the generation part 14D by performing multi-hop wireless communications.

Thus, the communication control part 14A is capable of controlling the communication unit 16 so as to transmit the control command signal generated by the generation part 14D to one or more of the other communication devices 10 that are connected in the direction toward the communication destination of the communication data for which a packet loss is detected, over the communication path of multi-hop wireless communications. At this time, the communication control part 14A may perform multi-hop wireless communications with the volume of traffic according to the communication parameter 18A stored in the storage unit 18.

As described above, the communication devices 10 included in the communication system 1 have the same configuration as one another. Thus, the communication device 10 receives, from another communication device 10, a control command signal generated in another communication device 10 by performing multi-hop wireless communications in some cases.

In this case, the communication control part 14A outputs, to the acquisition part 14E, the control command signal received by the communication unit 16 from another communication device 10.

The acquisition part 14E acquires the control command signal. The acquisition part 14E acquires, through the communication control part 14A, the control command signal generated by the generation part 14D. The acquisition part 14E also acquires, through the communication unit 16 and the communication control part 14A, the control command signal generated by the generation part 14D in another communication device 10.

The acquisition part 14E outputs the acquired control command signal to the change part 14F.

The change part 14F changes the communication parameter 18A to reduce the volume of traffic per unit time in accordance with the control command signal.

Specifically, the change part 14F decreases at least one of the bit rate and the frame rate indicated in the communication parameter 18A. For example, the change part 14F changes the bit rate so as to be a value smaller than the value of the current bit rate. For example, the change part 14F changes the frame rate so as to be a value smaller than the value of the current frame rate.

Through the processing, the change part 14F changes the communication parameter 18A to reduce the volume of traffic per unit time of the communication data transmitted from the communication unit 16 by performing multi-hop wireless communications.

The communication control part 14A transmits the communication data to other communication devices 10 with the volume of traffic according to the changed communication parameter 18A by performing multi-hop wireless communications. Thus, the volume of traffic of the communication data communicated from the communication unit 16 to other communication devices 10 is reduced under the control of the communication control part 14A.

As described above, the communication parameter 18A may further include a FEC parameter. In this case, the change part 14F changes the FEC parameter to reduce the communication data in accordance with the control command signal. Specifically, the change part 14F changes the FEC parameter to reduce the redundancy of data, which is a FEC parameter.

Changing the FEC parameter can reduce data transmitted over the multi-hop wireless network, thereby reducing congestion.

The change part 14F may change the communication parameter 18A stored in the storage unit 18 to a preset initial value when the power of the communication device 10 is turned on after having been turned off.

An example is described next of a flow of communication processing executed by the communication device 10 of the present embodiment.

FIG. 6 is a flow chart illustrating an example of a flow of communication processing executed by the communication device 10.

The communication control part 14A first determines whether to transmit communication data to another communication device 10 by performing a multi-hop wireless communication (Step S100). For example, when receiving communication data from another communication device 10, the communication control part 14A determines to transmit the communication data to another communication device 10. For example, the communication control part 14A determines to transmit the predetermined communication data to another communication device 10 when a predetermined timing has been reached.

If the determination is affirmative at Step S100 (Yes at Step S100), the routine continues to Step S102. At Step S102, the communication control part 14A reads the communication parameter 18A from the storage unit 18 (Step S102). The communication control part 14A then controls the communication control part 14A so as to perform a multi-hop wireless communication of the communication data to be communicated, in accordance with the communication parameter 18A read at Step S102. This control causes the communication unit 16 to transmit the communication data (Step S104).

Subsequently, the communication control part 14A determines whether the communication is successful for the transmission of the communication data at Step S104 (Step S106). The communication control part 14A makes the determination at Step S106 by judging whether at least a part of packets included in the communication data is lost while a multi-hop wireless communication of the communication data is being performed with another communication device 10.

If the determination is affirmative at Step S106 (Yes at Step S106), the routine continues to Step S108. At Step S108, the communication control part 14A updates the communication history information 18B (Step S108). At Step S108, the communication control part 14A correlates with one another the communication date and time, the node ID of the communication destination, the communication result indicating success in the communication, and enters the correlated information in the communication history information 18B. This routine is then ended.

Meanwhile, if the determination is negative at Step S106 (No at Step S106), the communication control part 14A updates the communication history information 18B (Step S110). At Step S110, the communication control part 14A correlates with one another the communication date and time, the node ID of the communication destination, the communication result indicating the error in the communication, and enters the correlated information in the communication history information 18B.

Subsequently, the communication control part 14A outputs the communication result indicating the error in the communication to the detection part 14B. The detection part 14B detects a packet loss by receiving the communication result indicating the error in the communication (Step S112).

Subsequently, the determination part 14C determines whether a burst loss has occurred (Step S114). The determination part 14C makes the determination at Step S114 by judging whether the communication history information 18B satisfies a predetermined condition. In a case in which at least one of the following is satisfied: the communication history information 18B satisfies the predetermined condition; and an error correction using FEC is unable to be made to the communication data, the determination part 14C may determine that a burst loss has occurred.

If the determination part 14C determines that no burst loss has occurred (No at Step S114), this routine is ended. If the determination part 14C determines that a burst loss has occurred (Yes at Step S114), the routine continues to Step S116.

At Step S116, the generation part 14D generates a control command signal (Step S116). At this time, the generation part 14D refers to the connection management information 18C and identifies the node ID of the communication destination to which the communication control signal is transmitted. The generation part 14D then notifies the communication control part 14A of the communication control signal and the node ID of the communication destination.

The communication control part 14A controls the communication unit 16 so as to transmit the control command signal generated at Step S116 to each of one or more of the communication devices 10 identified by the identification information received from the generation part 14D by performing a multi-hop wireless communication (Step S118).

Subsequently, the acquisition part 14E acquires the control command signal generated at Step S116, from the generation part 14D through the communication control part 14A (Step S120).

Subsequently, the change part 14F changes the communication parameter 18A to reduce the volume of traffic per unit time in accordance with the control command signal acquired at Step S120 (Step S122).

The communication control part 14A then reads the changed communication parameter 18A from the storage unit 18 (Step S124). The communication control part 14A controls the communication unit 16 so as to perform a multi-hop wireless communication of the communication data that has been determined at Step S106 to have a communication error, with the volume of traffic according to the communication parameter 18A read at Step S124. Thus, the communication unit 16 transmits again, to another communication device 10, the communication data determined last time to have a communication error, with the volume of traffic according to the communication parameter 18A, after the change (Step S126). This routine is then ended. After processing at Step S126, the routine may return to Step S106 described above.

Meanwhile, if the determination is negative at Step S100 (No at Step S100), the routine continues to Step S128. At Step S128, the communication control part 14A determines whether the control command signal has been received from another communication device 10 through the communication unit 16 (Step S128). If the determination is negative at Step S128 (No at Step S128), this routine is ended.

If the determination is affirmative at Step S128 (Yes at Step S128), the routine continues to Step S130. At Step S130, the acquisition part 14E receives the control command signal from another communication device 10 through the communication control part 14A and the communication unit 16 (Step S130).

The change part 14F changes the communication parameter 18A to reduce the volume of traffic per unit time in accordance with the control command signal acquired at Step S130 (Step S132). This routine is then ended.

As described above, the communication devices 10 of the present embodiment each has the acquisition part 14E and the communication control part 14A. The acquisition part 14E acquires a control command signal regarding the volume of traffic per unit time. The change part 14F changes a communication parameter for communication control to reduce the volume of traffic per unit time in accordance with the control command signal. The communication control part 14A performs multi-hop wireless communications with the volume of traffic according to the changed communication parameter.

Here, conventional technologies have had difficulty in preventing congestion of communication data communicated over a multi-hop network. A conventional technology discloses a technique of recovering a burst loss by a specified time by transmitting an error correcting packet later than video data by the specified time. With the conventional technology applied to a multi-hop network, however, it has been difficult to prevent congestion of communication data. Specifically, in the conventional technology, in which wireless relays are performed multiple times over a communication path and MAC is not retransmitted in multicast, more packet losses have occurred on a random basis, thereby causing a disturbance of communication data to occur. Also, with the conventional technology applied to a multi-hop network, data is continuously transmitted from a child node while data received from the child node is transferred to a parent node, which has made it difficult to prevent congestion of communication data.

By contrast, in the communication device 10 of the present embodiment, when the acquisition part 14E acquires the control command signal, the change part 14F changes a communication parameter to reduce the volume of traffic per unit time. Thus, in a case in which the control command signal is acquired, the communication control part 14A can perform multi-hop wireless communications with other communication devices 10 with the volume of traffic according to the communication parameter changed to reduce the volume of traffic per unit time.

Consequently, communications of packets included in communication data communicated over the multi-hop network and packet losses can be prevented in the communication device 10 of the present embodiment.

Congestion of communication data communicated over the multi-hop network can, therefore, be prevented in the communication device 10 of the present embodiment.

Packet delays can also be prevented in the communication device 10 of the present embodiment. Thus, the end that receives communication data from the communication device 10 of the present embodiment can receive communication data in which a disturbance and missing are prevented. In other words, in addition to the aforementioned effects, the communication device 10 of the present embodiment can prevent a disturbance and missing from occurring in video data, which is an example of communication data.

Packet losses can also be prevented in the communication device 10 of the present embodiment. Thus, the end that receives communication data from the communication device 10 of the present embodiment can receive communication data in which a disturbance is prevented. In other words, in addition to the aforementioned effects, the communication device 10 of the present embodiment can prevent a disturbance from occurring in video data, which is an example of communication data.

In the present embodiment, the case in which the network topology of the multi-hop network that constitutes the communication system 1 has been illustrated as an example (see FIG. 1). The network topology of the communication system 1, however, is not limited to a tree-shaped topology. For example, the network topology of the communication system 1 may be of star type or mesh type.

In the present embodiment, the case in which the communication devices 10 that constitute the communication system 1 each includes the communication control part 14A, the detection part 14B, the determination part 14C, the generation part 14D, the acquisition part 14E, and the change part 14F has been described as an example. However, at least one of the communication devices 10 that constitute the communication system 1 may include the communication control part 14A, the detection part 14B, the determination part 14C, the generation part 14D, the acquisition part 14E, and the change part 14F.

The computer programs to execute the aforementioned processing in the embodiment described above may be configured to be provided by being recorded into a computer-readable recording medium, such as a CD-ROM, FD, CD-R, DVD, USB memory, in a installable or executable file format, or may be configured to be provided or distributed via a network such as the Internet. Various types of computer programs may also be configured to be provided by being preinstalled on a ROM or the like.

The computer programs to execute the aforementioned processing in the embodiment described above have a modular configuration including the aforementioned functional parts. As actual hardware, for example, a CPU (processor circuit) reads the aforementioned computer program from a ROM or an HDD and executes the computer program, whereby the functional parts are loaded into a RAM (main memory) and the functional parts are generated into the RAM (main memory). The functional parts can also be implemented in whole or in part using special-purpose hardware, such as an application specific integrated circuit (ASIC) and a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    processing circuitry configured to:
        determine whether a burst loss of transmission data transmitted from the electronic apparatus by a multi-hop wireless communication has occurred, the burst loss being determined based on a detected packet loss of the transmission data;
        in response to determining that the burst loss has occurred, generate a first control command instructing electronic apparatuses including the electronic apparatus to reduce a transmission rate representing a volume of traffic per unit time; and change a communication parameter to reduce a transmission rate applied to the electronic apparatus in accordance with the first control command; and communication circuitry configured to:

output the first control command generated by the processing circuitry to a communication path of the multi-hop wireless communication such that the first control command is transmitted to one or more of the electronic apparatuses that are connected in a direction toward a communication destination of the transmission data corresponding to the detected packet loss; and transmit again the transmission data by performing a multi-hop wireless communication with a transmission rate according to the changed communication parameter.

2. The electronic apparatus according to claim 1, wherein the communication circuitry is configured to receive a second control command to reduce the transmission rate, the second control command being sent from another electronic apparatus over a communication path of the multi-hop wireless communication, and the processing circuitry is configured to change the communication parameter to reduce the transmission rate applied to the electronic apparatus in accordance with the second control command.

3. The electronic apparatus according to claim 1, wherein the communication parameter includes at least one of a bit rate of transmission data and a frame rate of the transmission data.

4. The electronic apparatus according to claim 3, wherein the communication parameter includes at least one of a bit rate of transmission data and a frame rate of the transmission data, and a forward error correction parameter.

5. A communication method implemented by a computer installed in one of electric apparatuses, the method comprising:

determining whether a burst loss of transmission data transmitted from the computer by a multi-hop wireless communication has occurred, the burst loss being determined based on a detected packet loss of the transmission data;

in response to determining that the burst loss has occurred, generating a first control command instructing the electric apparatuses to reduce a transmission rate representing a volume of traffic per unit time;

changing a communication parameter to reduce a transmission rate applied to the computer in accordance with the first control command;

outputting the generated first control command to a communication path of the multi-hop wireless communication such that the first control command is transmitted to one or more of the electric apparatuses that are connected in a direction toward a communication destination of the transmission data corresponding to the detected packet loss; and transmitting again the transmission data by performing a multi-hop wireless communication with a transmission rate according to the changed communication parameter.

6. The communication method according to claim 5, further comprising:

receiving a second control command to reduce the transmission rate, the second control command being sent from another computer over a communication path of the multi-hop wireless communication; and changing the communication parameter to reduce the transmission rate applied to the computer in accordance with the second control command.

7. A computer program product having a non-transitory computer readable recording device in which executable instructions are stored, wherein the instructions, when executed by a computer installed in one of electric apparatuses, cause the computer to perform:

determining whether a burst loss of transmission data transmitted from the computer by a multi-hop wireless communication has occurred, the burst loss being determined based on a detected packet loss of the transmission data;

in response to determining that the burst loss has occurred, generating a first control command instructing the electric apparatuses to reduce a transmission rate representing a volume of traffic per unit time;

changing a communication parameter to reduce a transmission rate applied to the computer in accordance with the first control command;

outputting the generated first control command to a communication path of the multi-hop wireless communication such that the first control command is transmitted to one or more of the electric apparatuses that are connected in a direction toward a communication destination of the transmission data corresponding to the detected packet loss; and transmitting again the transmission data by performing a multi-hop wireless communication with a transmission rate according to the changed communication parameter.

8. The computer program product according to claim 7, wherein the instructions further cause the computer to perform:

receiving a second control command to reduce the transmission rate, the second control command being sent from another computer over a communication path of the multi-hop wireless communication; and changing the communication parameter to reduce the transmission rate applied to the computer in accordance with the second control command.

9. A communication system comprising:

a plurality of electronic apparatuses configured to perform a multi-hop wireless communication, wherein at least one of the electronic apparatuses comprises:

processing circuitry configured to:

determine whether a burst loss of transmission data transmitted from the electronic apparatus by a multi-hop wireless communication has occurred, the burst loss being determined based on a detected packet loss of the transmission data;

in response to determining that the burst loss has occurred, generate a first control command instructing the plurality of electronic apparatuses to reduce a transmission rate representing a volume of traffic per unit time; and change a communication parameter to reduce a transmission rate applied to the at least one of the electronic apparatus in accordance with the first control command; and communication circuitry configured to:

output the first control command generated by the processing circuitry to a communication path of the multi-hop wireless communication such that the first control command is transmitted to one or more of the plurality of electronic apparatuses that are connected in a direction toward a communication destination of the transmission data corresponding to the detected packet loss; and transmit again the transmission data by performing a multi-hop wireless communication with a transmission rate according to the changed communication parameter.

10. The communication system according to claim 9, wherein the communication circuitry is configured to receive a second control command to reduce the transmission rate, the second control command being sent from another electronic apparatus over a communication path of the multi-hop wireless communication, and the processing circuitry is configured to change the communication parameter to reduce the transmission rate applied to the electronic apparatus in accordance with the second control command.

* * * * *